No. 764,977. PATENTED JULY 12, 1904.
W. BÄUERLE.
BALL BEARING FOR SPINDLES.
APPLICATION FILED APR. 25, 1904.
NO MODEL. 2 SHEETS—SHEET 2.
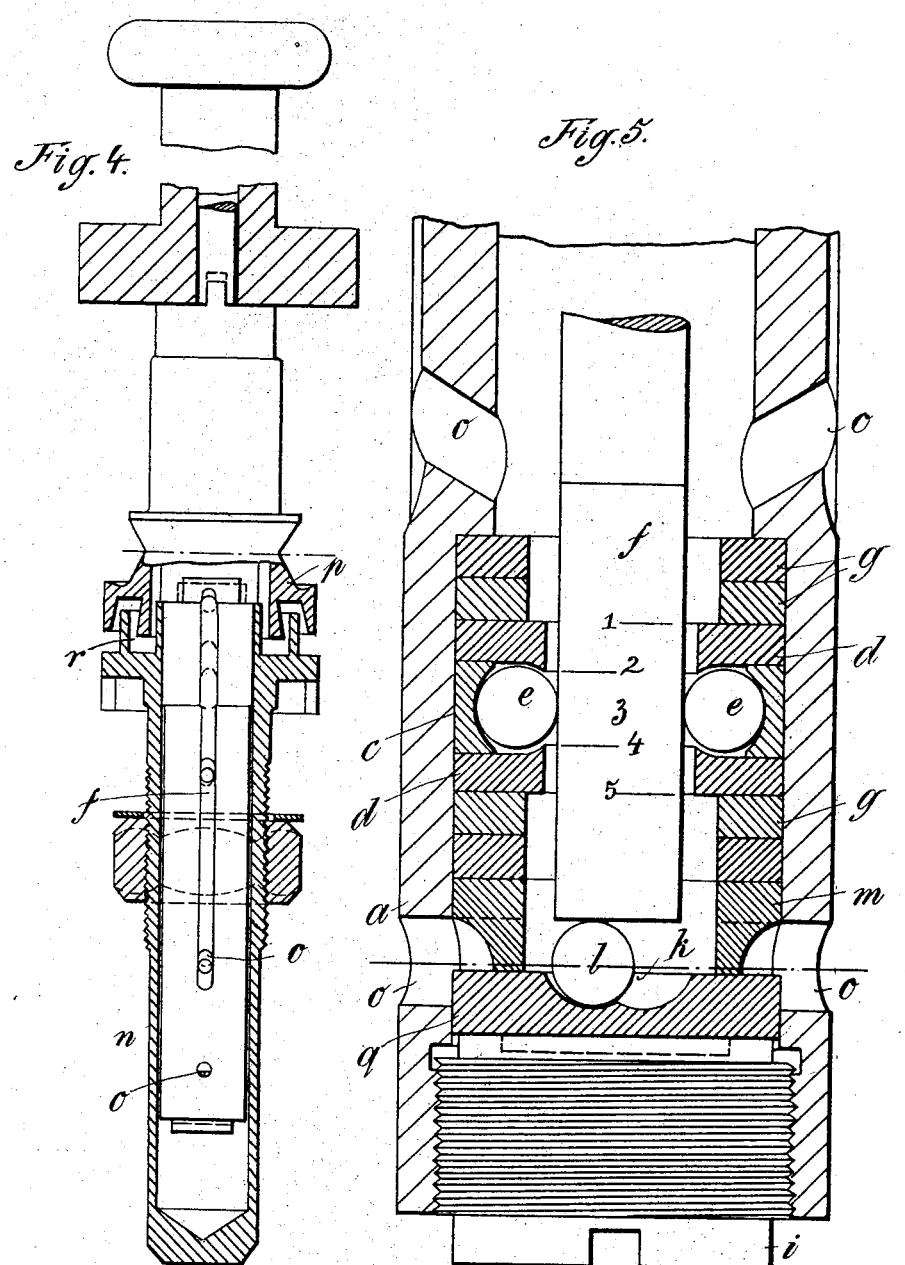
Witnesses:
Inventor
Wilhelm Bäuerle No. 764,977. Patented July 12, 1904.

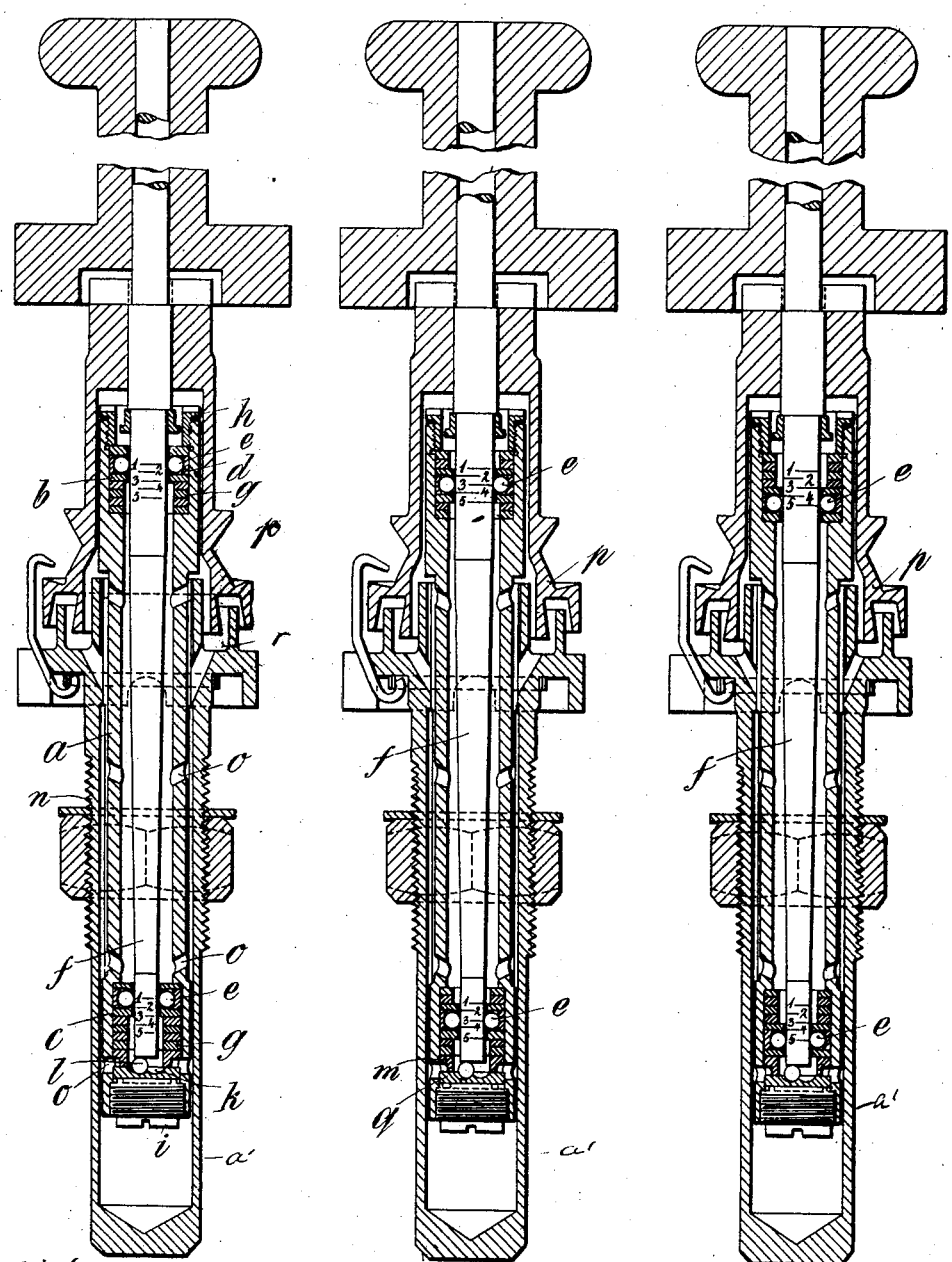

UNITED STATES PATENT OFFICE.

WILHELM BÄUERLE, OF AUGSBURG, GERMANY.

BALL-BEARING FOR SPINDLES.

SPECIFICATION forming part of Letters Patent No. 764,977, dated July 12, 1904.

Application filed April 25, 1904. Serial No. 204,835. (No model.)

*To all whom it may concern:*

Be it known that I, WILHELM BÄUERLE, a citizen of the Kingdom of Bavaria, German Empire, residing at Augsburg, Bavaria, Germany, have invented a new and useful Ball-Bearing for Spindles, of which the following is a specification.

My invention relates to an improvement in ball-bearings for spindles, particularly such as used in spinning-machines, twisting-frames, bobbin-frames, and the like, and aims to provide means for displacing, when occasion requires, the bearing-point of the balls, which is necessary owing to the fact that the spindle becomes worn or grooved, such objection being often caused through improper lubrication.

In order to put the bearing-point of the balls in a different place according to my invention, I arrange above or beneath the brasses of the bearing, which inclose the running-balls, disks which loosely surround the spindle and may be held in place by a thumb-screw or the like.

I attain these objects by the means illustrated in the accompanying drawings, in which—

Figures 1 to 3 show vertical sections of the ball-bearing for spindles, the bearing-points of their balls being shown in different places. Fig. 4 shows the box and spindle in elevation, and Fig. 5 is a sectional view of the step-bearing on an enlarged scale.

The bolster $a$, seated in the bolster-case $a'$, has on its upper and lower ends recesses $b$ and $c$, respectively, into which are inserted the brasses $d$ of the balls $e$.

In order to axially displace the touching points of the balls $e$ upon the spindle, I bring rings $g$ above or beneath the brasses $d$, as the case may be, into the recesses $b$ and $c$.

The brasses $d$ and rings $g$ are held in place by two screws $h$ and $i$ on the upper and lower ends of the box $a$, respectively. The upper screw, $h$, permits the entrance of oil for lubrication. Between the screw $i$ and the brass $d$ or the rings $g$, Fig. 5, is still inserted a steel plate $q$, which in known manner is provided with a circular recess $k$ for the reception of the step-ball $l$ and a ring $m$, which conducts the lubricant entering the box $a$ through holes $o$ to the balls $l$.

As indicated by 1 2 3 4 5 in Figs. 1 to 3, the bearing-point of the balls may, for instance, be put in five different places on using four inserting-rings $g$.

The lubricant flows from the cup $r$ down between the fixed socket $n$ and the bolster $a$ and enters the bolster $a$ by the said holes $o$. The revolving spindle $f$ forces the lubricant up over the edge of the hollow screw $h$, whence it flows back into the cup $r$.

What I claim as my invention, and desire to secure by Letters Patent, is—

In a ball-bearing for spindles, the combination with the spindle, of a bolster surrounding the spindle and provided with a recess in its inner face at each end, brasses arranged in the said recesses, balls mounted in the brasses, removable insertion-rings mounted in said recesses and adapted to vertically adjust the brasses, causing thereby the positioning of the balls at different points throughout the length of the spindle, and a pair of removable nuts having external threads engaging internal threads on the ends of the bolster for retaining the rings, brasses and balls in position.

In witness whereof I have hereunto set my hand in presence of two witnesses.

WILHELM BÄUERLE.

Witnesses:
M. DELLER,
HERMAN LANGE.